US012812069B2

(12) United States Patent
White

(10) Patent No.: US 12,812,069 B2
(45) Date of Patent: Nov. 24, 2026

(54) GENERATIVE COMMUNICATION SESSION EVENT EFFECTS

(71) Applicant: Microsoft Technology Licensing, LLC, Redmond, WA (US)

(72) Inventor: Ryen W. White, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 76 days.

(21) Appl. No.: 18/442,818

(22) Filed: Feb. 15, 2024

(65) Prior Publication Data

US 2025/0267239 A1 Aug. 21, 2025

(51) Int. Cl.
*H04N 7/15* (2006.01)
*G06F 3/04842* (2022.01)
*H04L 65/4038* (2022.01)

(52) U.S. Cl.
CPC ......... *H04N 7/157* (2013.01); *G06F 3/04842* (2013.01); *H04L 65/4038* (2013.01)

(58) Field of Classification Search
CPC .. H04N 7/157; G06F 3/04842; H04L 65/4038
USPC ....................................................... 348/14.08
See application file for complete search history.

(56) References Cited

U.S. PATENT DOCUMENTS 6,151,619 A * 11/2000 Riddle ................ H04L 12/1822 709/204
11,501,658 B2 * 11/2022 Ramani .................... G09B 5/02
11,816,672 B1 * 11/2023 Singh .................... H04L 63/105
11,863,333 B2 * 1/2024 Swerdlow ............. H04L 51/046
2012/0209913 A1 8/2012 Ananthanarayanan
2020/0296329 A1 * 9/2020 Tang ....................... G06F 40/14
2020/0366510 A1 11/2020 Sexauer et al.
2020/0403817 A1 * 12/2020 Daredia ................ G10L 15/083
2024/0022409 A1 * 1/2024 Roper ....................... H04L 9/50
2024/0259668 A1 * 8/2024 Li ........................ H04N 23/611
2025/0069308 A1 * 2/2025 Cameron ................ G10L 25/30

FOREIGN PATENT DOCUMENTS

CN 104871184 A 8/2015

OTHER PUBLICATIONS

Extended European Search Report Received for European Patent Application No. 25157832.4, mailed on Jun. 10, 2025, 10 pages.

* cited by examiner

*Primary Examiner* — Binh Kien Tieu
(74) *Attorney, Agent, or Firm* — Rainier Patents, P.S.

(57) ABSTRACT

In examples, an "event effect" is an introductory segment that is an intro for a communication participant and/or an exit segment that is an outro for a communication participant. At least a part of the segment may be produced using a generative machine learning model, for example to incorporate a likeness of the participant into the segment, to generate a segment that is based on or otherwise relates to a user's background, and/or to generate at least a part of the segment according to a prompt, among other examples. In some instances, an event effect is displayed in advance of the arrival or departure of a communication participant and/or an advance indication is presented prior to displaying the event effect. As a result, other participants are alerted that a participant will soon join or leave the communication session accordingly.

18 Claims, 11 Drawing Sheets

GENERATIVE COMMUNICATION SESSION EVENT EFFECTS

BACKGROUND

In examples, participants of an online communication session join and leave throughout the communication session. However, such changes to attendees of a communication session are typically either unannounced or announced in a way that may be jarring to other participants. As a result, entry by a new participant may either be disruptive or may go unnoticed by existing participants, either of which may negatively affect the communication session. Similarly, a departing participant may find it challenging to interject before leaving, thereby either interrupting the flow of the meeting or leaving without providing closing thoughts. These and other detriments may thus hamper online communication sessions as compared to their real-world alternatives.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to generative communication session event effects. For example, an "event effect" may be an introductory segment that is an intro for a communication participant and/or an exit segment that is an outro for a communication participant, among other examples. In examples, at least a part of the segment is produced using a generative machine learning model, for example to incorporate a likeness of the participant into the segment, to generate a segment that is based on or otherwise relates to a user's background, and/or to generate at least a part of the segment according to a prompt, among other examples. In some instances, an event effect is displayed in advance of the arrival or departure of a communication participant and/or an advance indication is presented prior to displaying the event effect. As a result, other participants are alerted that a participant will soon join or leave the communication session accordingly.

Thus, the disclosed aspects improve the user experience of online communication sessions by conveying information relating to a variety of communication session events in a way that is engaging without being disruptive while also providing additional contextual information to participants, among other benefits.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
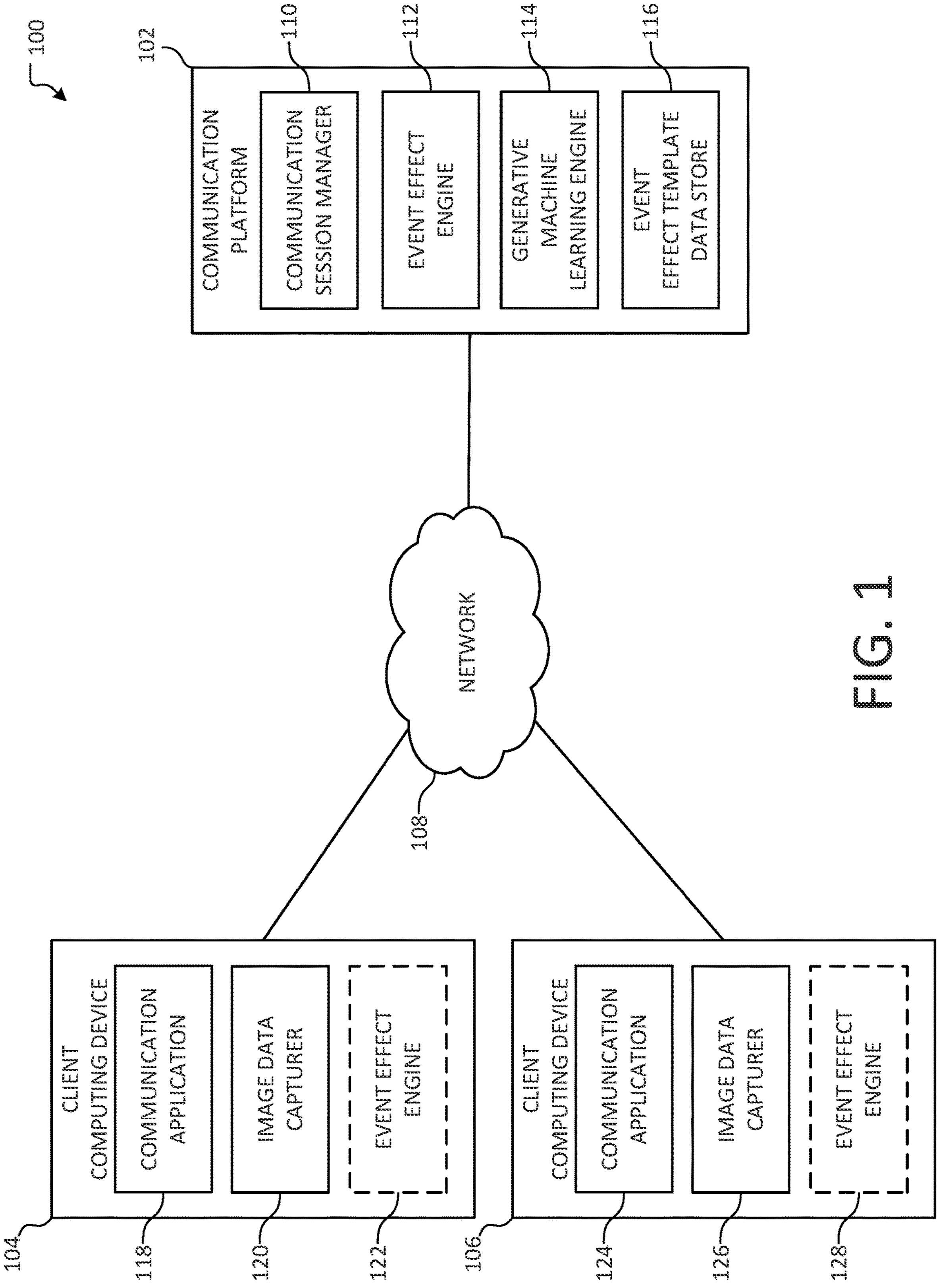
FIG. 1 illustrates an overview of an example system in which generative communication event effects are used according to aspects of the present disclosure.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

In examples, a set of communication participants join an online communication session. An online communication session includes any of a variety of media types, including, but not limited to, audio (e.g., a teleconference), video (e.g., a video conference), and/or three-dimensional (3D) assets (e.g., as may be used in virtual reality (VR) and/or augmented reality (AR)), among other examples. However, participants may join and leave, such that attendance changes during the communication session. In some examples, entering and/or departing participants are unannounced, leaving the preexisting/remaining participants to check the participant list and/or an activity log in order to identify changes in attendance. In other examples, entering and/or departing participants are announced (e.g., with an audible alert and/or visual notification), which may interrupt the preexisting/remaining participants. These and other scenarios may negatively affect an ongoing communication session, for example by affecting the flow of the meeting, by making it difficult for participants to converse during changes in attendance, and/or by obscuring attendance changes (e.g., such that an existing participant may attempt to converse with a participant that has since departed and/or such that existing participants do not realize a participant has joined the call), among other detriments.

Accordingly, aspects of the present disclosure relate to generative communication session event effects. As used herein, an "event effect" includes an introductory segment that is played as an intro for a communication participant and/or an exit segment that is played as an outro for a communication participant, among other examples. Such an event effect may include, but is not limited to, video, text (e.g., in a chat of the communication session and/or superimposed in a video stream), an image, audio, and/or an animation (e.g., including one or more two-dimensional (2D) and/or 3D assets), among other examples. As discussed below, at least a part of the segment may be produced using a generative machine learning (ML) model, for example to incorporate a likeness of the participant into the segment, to generate a segment that is based on or otherwise relates to a user's background, and/or to generate at least a part of the segment according to a prompt, among other examples.

Thus, it will be appreciated that intros/outros are provided as example events for which event effect segments are generated according to aspects described herein. However any of a variety of additional or alternative communication session events may similarly be subject to the disclosed event effects, including, but not limited to, transitioning to a breakout room of an online communication session, muting/unmuting a communication participant, an instance of a particular word or phrase (e.g., in chat and/or audio stream), and/or when a user provides an indication that they would like to interject (e.g., by actuating a "raise hand" button), among other examples.

In examples, a communication participant configures one or more event effects prior to and/or during a communication session. For example, the communication participant selects an event effect, which may be stored in association with a user profile for the participant, such that the event effect is identified and presented during a subsequent communication session accordingly. In some instances, such an event effect is selected from a pre-configured set of event effects based on a meeting type, a meeting duration, and/or based on the participants of the meeting, among other examples.

For instance, the participant may have one or more event effects that are available for a personal communication session (e.g., as part of a personal persona for the participant), whereas another set of event effects are available for a professional communication session (e.g., as part of a professional persona for the participant). It will be appreciated that a personal set of event effects and a professional set of event effects need not each include an exclusive set of event effects. Further, any of a variety of additional and/or alternative contexts may be used for which a user defines one or more event effects according to aspects described herein.

A communication application may include a "join" button and a "join with effect" button, thereby enabling the communication participant to decide between quietly joining the meeting (e.g., without presentation of an effect) and joining the meeting using an event effect according to aspects described herein. A preconfigured event effect may be identified automatically (e.g., when a participant joins or leaves a communication session). In another example, the participant selects an event effect to be presented to other participants (e.g., after actuating the "join with effect" button). In examples, the participant is prompted for additional information and/or additional information is obtained. For example, the additional information relates to a biography for the participant and/or to the content of the meeting, as may be determined from a corresponding user profile, a calendar invitation, corresponding email chain, and/or meeting transcript. Additionally, or alternatively, the communication application includes a "leave" button and a "leave with effect" button, thereby enabling the communication participant to decide between quietly leaving the meeting and leaving the meeting using an event effect according to aspects described herein.

In examples, an event effect is associated with multiple participants, for example in instances where multiple participants join or leave a communication session contemporaneously. As another example, an event effect is associated with multiple participants in an instance where the participants are in physical proximity and/or attending the communication session via the same computing device (e.g., in a conference room, via a conferencing system of the room). As a further example, multiple event effects are interrelated, such that, for example, an event effect for a first user integrates with an event effect for a second user (e.g., thereby introducing each participant sequentially or alternating between participants, among other examples).

Example event effects include, but are not limited to, a segment depicting that one or more participants are beamed down, beamed up, blasting off in a rocket, pulled off stage by a Vaudeville hook, riding off into the sunset, riding in from a virtual background (e.g., as may be displayed behind the participant), and/or appearing as one or more superheroes. Additionally, or alternatively, an event effect includes one or more associated audio tracks and/or chat messages, among any of a variety of other content types.

For instance, a biography of a participant may be entered into a chat conversation of the communication session, thereby enabling other participants to learn about the participant as the participant joins the communication session. As another example, a set of takeaways may be entered into the chat conversation upon departure of a participant. Such additional information (e.g., the participant's biography and/or the meeting takeaways) may be provided by the participant (e.g., in response to a prompt) and/or generated (e.g., based on a user profile for the participant and/or a meeting transcript, among other data sources). In another instance, a participant's name and/or job title are superimposed in the participant's video feed when the participant first speaks after joining the communication session.

An event effect may be played at any of a variety of times during a communication session. As noted above, an event effect may be played when a participant joins and/or leaves a communication session, among other examples. However, such an event effect may be played additionally or alternatively in response to another communication participant joining, leaving, and/or based on a variety of events for the other communication participant. For example, if a first communication participant joins a communication session, thereby causing an intro event effect to be played, the intro event effect may additionally be played for a second communication participant that joined after the first communication participant (e.g., as a result of the first communication participant speaking during the communication session for the first time since the second communication participant joined). As another example, a first communication participant may initiate an event effect for another communication participant (e.g., when the first communication participant mutes or removes the second participant).

In examples, an event effect is displayed in advance of the departure of a communication participant. For instance, at least a part of the event effect may play prior to the participant actually leaving the communication session. For example, in an instance where a participant is beamed up, the event effect may include a sequence that depicts a teleporter being powered up. Additionally, or alternatively, an advance indication is presented prior to displaying the event effect. For example, a countdown is displayed prior to the start of the event effect (e.g., as a user interface element of the communication application and/or over a participant's person/avatar), thereby indicating to other participants that the participant will soon leave the communication session. Thus, one or more other participants have the opportunity to engage with the departing participant prior to their departure. As another example, a participant that is currently speaking may address the participant's imminent departure and/or provide that individual with closing thoughts, among other examples.

Similarly, an advance indication may be presented for a participant that is joining the communication session. For example, an event effect including footsteps, knocking, and/or a door creaking may provide an advance indication to existing communication participants as to an incoming participant, such that the existing participants may greet the incoming participant and/or change topics to one that is more relevant to the incoming participant, among other examples. In some examples, an event effect is adapted based on the participant, for example to include footsteps, a gait, and/or a knock that is representative of that participant, among other examples.

Thus, rather than an abrupt departure or requiring that a departing participant interrupt others to announce their departure, the disclosed aspects provide an additional or alternative mechanism by which changes to communication session attendance are indicated to other participants and, in some examples, that further allow participants to react prior to occurrence of the event.

In examples, a user indicates a preference to automatically exit a communication session prior to or during the communication session. For example, the user indicates that an event effect should automatically be initiated so the user can depart (e.g., to attend another meeting scheduled after that communication session). Additionally, or alternatively, it may automatically be determined to depart a communication session, for example based on determining a subsequent meeting is one that the user has not missed or that has a higher priority, among other examples. In instances where the user has a subsequent communication session, an outro event effect of the first communication session may pair with an intro event effect for the second communication session.

Similar to the aspects noted above where multiple communication participants may have the same intro event effect or event effects that are interrelated, such aspects may also be used for an outro event effect. In examples, a first communication participant may choose to join an outro event effect of a second communication participant, such that the first and second communication participants depart the communication session together (e.g., via the same event effect or interrelated event effects). As another example, a departing participant invites one or more other communication participants to depart together, such that other communication participants can accept the invite and thus depart the communication session together accordingly.

It will be appreciated that an event effect segment may be generated according to any of a variety of techniques. As an example, an event effect template includes a set of content with which to generate an event effect segment, including but not limited to, one or more videos, audio tracks, sound effects, and/or text, among other examples. In such an example, the event effect template is populated with content relating to the communication participant, for example to incorporate a likeness of the participant into the event effect template by compositing an image and/or video of the user into a video of the event effect template. The image and/or video may be preexisting, may have been captured as part of the communication session, and/or may be contemporaneously captured, among other examples.

Additionally, or alternatively, an event effect template is processed using a generative ML model to produce generative content that is presented as the event effect segment accordingly. For example, the event effect template includes a prompt that is processed to produce the generative content. In examples, the event effect template includes content that is processed by the generative ML model (e.g., to incorporate the likeness of the user into an image/video of the event effect template). As another example, a prompt of the event effect template causes the generative ML model to generate content based thereon without additional content from the event effect template. Similar to the above-noted aspects, a preexisting depiction of the participant may be used (e.g., as may have been captured as part of the communication session) and/or a depiction of the participant may be contemporaneously captured, among other examples.

It will be appreciated that any of a variety of generative ML models may be used according to aspects described herein. A generative ML model used according to aspects described herein may generate any of a variety of output types (and may thus be a multimodal generative model, in some examples) and may be a generative transformer model and/or a large language model (LLM), among other examples. Example models, include, but are not limited to, diffusion models, image/audio models (e.g., DALL-E, LIRA, and/or Jukebox), and/or large language models (LLMs) like GPT-3, GPT-3.5, GPT-4, PaLM, LLaMA, or BLOOM, among other examples. In examples, an LLM is used to generate a prompt for processing by one or more other models, which may thus be processed by the other model(s) to produce generative content accordingly. Additional examples of such aspects are discussed below with respect to the generative ML model illustrated in FIGS. 4A-4B.

In examples, one or more instructions are provided to the user, for example to capture one or more poses with which to generate the event effect segment. Additionally, or alternatively, a set of representative poses are presented for the participant to mimic. In some examples, the instructions are generated by the generative ML model (e.g., based on a prompt of the event effect template).

As noted above, an event effect may integrate with or otherwise be associated with a user's background. For example, an event effect template may have one or more other corresponding assets, such as a virtual background and/or a background effect that is applied to a participant's background, among other examples. Accordingly, an event segment generated based on the event effect template may cause it to appear that the user is interacting with the background, for example driving into a sunset of the background or driving in from a road displayed in the background. It will be appreciated that such aspects are provided for illustrative purposes and any of a variety of additional and/or alternative interactions may be implemented in other examples.

While examples are described with reference to a user's physical likeness (e.g., as may be captured by a webcam or other image capture device), it will be appreciated that any of a variety of other representations may be used for the user. For example, a user's 2D or 3D avatar may be used to generate an event effect segment or information may be used from any of a variety of other user profiles (e.g., of a video game or of another virtual environment), among other examples.

Thus, the disclosed aspects improve the user experience of online communication sessions by conveying information relating to a variety of communication session events in a way that is engaging without being disruptive. Additionally, or alternatively, such aspects may further provide contextual information to other participants as a result of enabling interactions between multiple participants, for example thereby illustrating multiple participants are part of a team or that the participants are attending the communication session from the same physical location, among other examples.

FIG. 1 illustrates an overview of an example system 100 in which generative communication event effects are used according to aspects of the present disclosure. As illustrated, system 100 includes communication platform 102, client computing device 104, client computing device 106, and network 108. It will be appreciated that while system 100 is illustrated as including a single communication platform 102 and a two computing devices 104 and 106, any number of such elements may be used in other examples. In examples, communication platform 102, client computing device 104, and/or client computing device 106 communicate via network 108, which may comprise a local area network, a wireless network, or the Internet, or any combination thereof, among other examples.

Communication platform 102 includes communication session manager 110, event effect engine 112, generative machine learning engine 114, and event effect template data store 116. Communication session manager 110 manages one or more communication sessions, each of which may have one or more participants. As an example, communication session manager 110 manages a communication session in which a first participant (e.g., a user of client computing device 104) and a second participant (e.g., a user of client computing device 106) are engaged. Accordingly, the first participant and the second participant each operate a communication application (e.g., communication application 118 and communication application 124, respectively) to communicate via the communication session. In examples, a communication session includes, but is not limited to, a video chat, a voice chat, and/or a text chat, among other examples.

Event effect engine 112 generates event effects according to aspects described herein. For example, when the second participant joins the communication session (e.g., using communication application 124 of client computing device 106), an introduction event segment is generated for the second participant, which is thus presented to participants of the communication session accordingly.

In examples, a user profile for the second participant specifies one or more event effects corresponding to a variety of possible communication session events, such that the event effect may be automatically determined (e.g., according to a user preference, to a meeting type, to a list of meeting attendees, a season, a day of week, and/or a time of day). As another example, communication application 124 requests, receives, or otherwise obtains user input with which the event effect segment is generated.

For example, the user may select an event effect from a list of available event effects, customize an attribute of the event effect from a list of available customizations (e.g., duration, theme, a character selection from a set of characters in the event effect), and/or provide biographical information to display as part of the event effect, among other examples. In examples, the second participant actuates a "join with effect" button of communication application 124 (e.g., rather than actuating a "join" button that would place the user directly in the communication session). As another example, the participant specifies a preference that causes them to join the communication session with an event effect (e.g., in an instance where only a "join" button is provided).

In addition to, or as an alternative to, information obtained from a user profile and/or from a user, event effect engine 112 may obtain data from one or more other data sources. For example, event effect engine 112 generates the event effect segment based on biographical information from a corporate directory, a website, and/or a social media profile of the participant. It will therefore be appreciated that any of a variety of data sources may be used to generate an event effect segment according to aspects described herein.

As illustrated, communication platform 102 includes event effect template data store 116, from which event effect engine 112 accesses an event effect template to generate an event effect segment according to aspects described herein. As noted above, an event effect template includes any of a variety of content with which the event effect segment is generated, for example such that event effect engine 112 processes the content to generate an event segment accordingly. Examples include, but are not limited to, superimposing text onto a video of the event template, incorporating a likeness of a user (e.g., using one or more images of the user, as may be provided by image data capturer 126 discussed below), and/or generating text (e.g., based on the event effect template and/or as may have been obtained from any of a variety of sources) for inclusion in a text chat of the communication session. While aspects are described herein with reference to an event effect template data store (e.g., from which content for an advance indication and/or an event effect are obtained), it will be appreciated that any of a variety of additional or alternative data sources may be used in other examples. For instance, a team and/or company could offer one or more event effects (e.g., which may be available for selection by a team member or employee) and/or a third-party marketplace may be provided for event effects, among other examples.

Additionally, or alternatively, generative machine learning engine 114 processes obtained information and an event effect template to produce generative content for an event effect segment. For example, an event effect template includes a prompt that describes video content, audio content, and/or textual content to be produced by generative machine learning engine 114. It will therefore be appreciated that generative machine learning engine 114 may include any of a variety of machine learning models. In examples, generative machine learning engine 114 additionally or alternatively processes information to produce the generative content, for example to integrate a likeness of a participant into a video (e.g., as may be produced by generative machine learning engine 114 and/or as may be included in the event template).

As another example, the event template includes a prompt with which generative machine learning engine 114 generates one or more additional prompts for processing by one or more other machine learning engines. Additionally, or alternatively, generative machine learning engine 114 processes the prompt to generate instructions for a participant (e.g., a set of poses the participant should assume for improved generative processing results), which are provided for display to the participant by a communication application (e.g., communication application 124).

Similarly, event effect engine 112 generates an outro event segment for the first participant when the first participant leaves the communication session (e.g., using communication application 118 of client computing device 104), which is thus presented to participants of the communication session accordingly. In examples, event effect engine 112 obtains information relating to one or more takeaways and/or closing thoughts for the communication session, as may be provided by the first participant (e.g., via communication application 118) and/or as may be generated based on a transcript of the communication session, among other examples. Similar to the introduction event segment, event effect engine 112 generates the outro event segment using image/video compositing techniques and/or generative machine learning engine 114, among other examples.

While examples are described in which an event template includes a prompt and/or an event effect template is used to process user-provided content, it will be appreciated that, in other examples, a user may define at least a part of an event effect template (e.g., by providing some or all of the prompt that is processed by generative machine learning engine 114). Further, event effect engines 122 and 128 are depicted using dashed boxes to indicate that, in some examples, at least a part of the processing discussed above with respect to communication platform 102 may additionally or alternatively be performed local to client computing device 104 and/or client computing device 106.

As illustrated, client computing device 104 includes communication application 118, image data capturer 120 and, in some examples, event effect engine 122. Aspects of client computing device 106 are similar to those discussed above with respect to client computing device 104 and are therefore not necessarily redescribed in detail.

As noted above, a participant operates communication application 118 to engage in a communication session via communication platform 102. According to the present aspects, one or more event effects are presented to the participant via communication application 118 and/or generated on behalf of the participant. In examples, preexisting image data for the participant is obtained and used to generate an event effect segment according to aspects described herein.

Additionally, or alternatively, image data capturer 120 obtains image data (e.g., as a still image and/or a video) of the participant, which may thus be used to generate one or more event segments according to aspects described herein. For example, the participant may be prompted to assume a certain pose and/or may provide a preference indication that image data of the participant can automatically be captured during an ongoing communication session with which to generate an event segment, among other examples.

In instances where event effect engine 122 is local to client computing device 104, the image data may thus be processed locally accordingly. In other examples, communication application 118 provides an indication of the image data to communication platform 102, such that event effect engine 112 processes the image data to generate an event effect segment accordingly.

It will be appreciated that system 100 is described with reference to example event effects and that any of a variety of additional and/or alternative segments may be provided in other examples. For instance, a single event effect segment may be generated for multiple participants (e.g., of client computing device 104 and client computing device 106), such that the event effect segment depicts each of the multiple participants accordingly. As another example, communication session manager 110 determines multiple participants are joining contemporaneously (e.g., within a predetermined amount of time), such that the participants are depicted within the same event segment. Further, event effect engine 112 may generate an event effect segment that is further based on a physical and/or virtual background of a participant, such that the participant is depicted as interacting with the background.

Figure 2A:
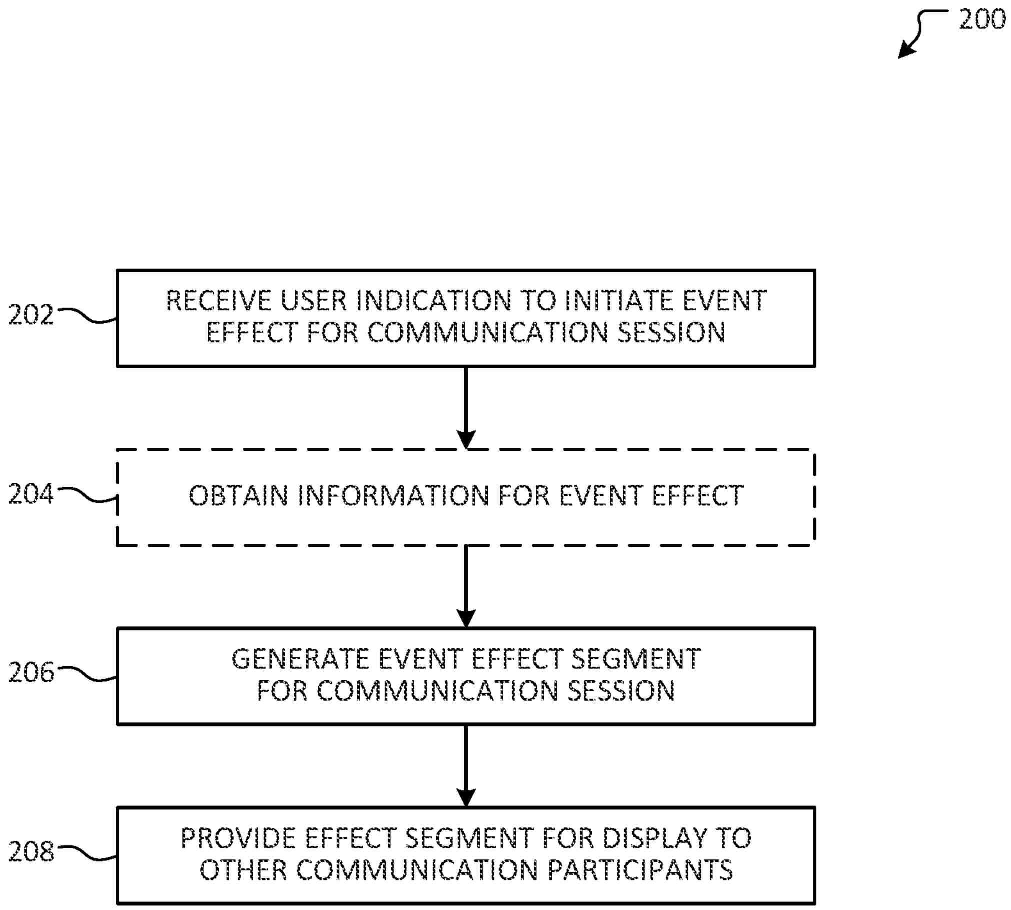
FIG. 2A illustrates an overview of an example method for initiating an event effect by a communication participant according to aspects described herein.

FIG. 2A illustrates an overview of an example method 200 for initiating an event effect by a communication participant according to aspects described herein. In examples, aspects of method 200 are performed by a client computing device, such as client computing device 104 and/or 106 discussed above with respect to FIG. 1.

As illustrated, method 200 begins at operation 202, where a user indication to initiate an event effect is received. As an example, the indication includes an explicit user actuation of a "join with effect" button. Additionally, or alternatively, the indication comprises an implicit indication, for example a user preference indication of an event effect to apply to the communication session and/or a user preference indication that, if other participants joined with an event effect, the user prefers to similarly join with an event effect. In examples, the indication received at operation 202 includes an indication of an event effect (e.g., as may be selected by a user). As another example, operation 202 comprises automatically identifying an event effect from a set of event effects, for example based on a user preference indication of one or more event effects that may be applied to a given meeting type. It will be appreciated that any of a variety of additional or alternative indications may be received in other examples.

At operation 204, information is obtained for the event effect. In examples, operation 204 comprises prompting the user for information, such that the user provides information (e.g., biographical information, meeting takeaways, and/or action items). Additionally, or alternatively, operation 204 comprises identifying information from one or more data sources, including, but not limited to, a biography for the user, a user's position within a corporate hierarchy, and/or a transcript/summary of the communication session, among other examples. In instances where such information is automatically identified, at least a part of the identified information may be presented to the user for user selection/revision. Additionally, or alternatively, the identified information is used to generate the event effect segment without further user input. Operation 204 is illustrated using a dashed box to indicate that, in some examples, operation 204 may be omitted.

For instance, an event effect may not include additional information and/or the user may wish to not include such additional information, among other examples.

Method 200 progresses to operation 206, where an event effect segment is generated. In examples, the event effect segment is generated based on the information that was obtained at operation 204 and/or based on a selection (e.g., implicit and/or explicit) of an event effect that was made at operation 202. Aspects of operation 206 may be performed local to the client computing device. Additionally, or alternatively, the described aspects are performed by a communication platform (e.g., communication platform 102 in FIG. 1), such that operation 206 comprises providing an indication as to information with which the event effect segment is generated by the communication platform. Such aspects may be similar to those discussed below with respect to operations 238 and 240 of method 230 in FIG. 2B. It will therefore be appreciated that any of a variety of techniques may be used to generate an event effect segment according to aspects described herein. In examples, aspects of method 300 and/or method 350 discussed below with respect to FIGS. 3A and 3B, respectively, are performed as part of operation 206.

As noted above, in some examples, generating the event effect segment comprises processing one or more assets of an event effect template, including, but not limited to, video, text, an image, audio, and/or an animation, among other examples. In such an example, operation 206 may comprise compositing an image and/or video of the user (e.g., as may be obtained by an image data capturer, such as image data capturer 120 and/or 126 discussed above with respect to FIG. 1) into a video of the event effect template.

Additionally, or alternatively, the event segment template includes a prompt that is processed (e.g., by generative machine learning engine 114 in FIG. 1) to produce the generative content included in the event segment according to aspects described herein. As noted above, the prompt is used to process content of the event effect template and/or to generate content based thereon without additional content from the event effect template, among other examples. In some examples, operation 206 comprises processing by multiple machine learning models, as may be the case when an LLM processes a prompt to further generate one or more prompts for one or more other machine learning models and/or instructions for a communication participant, among other examples.

At operation 208, the effect segment that was generated at operation 206 is provided for display to other communication participants of the communication session. In examples, operation 208 comprises providing the generated event segment to one or more other client computing devices (e.g., directly and/or via a communication platform). As illustrated, method 200 terminates at operation 208.

Figure 2B:
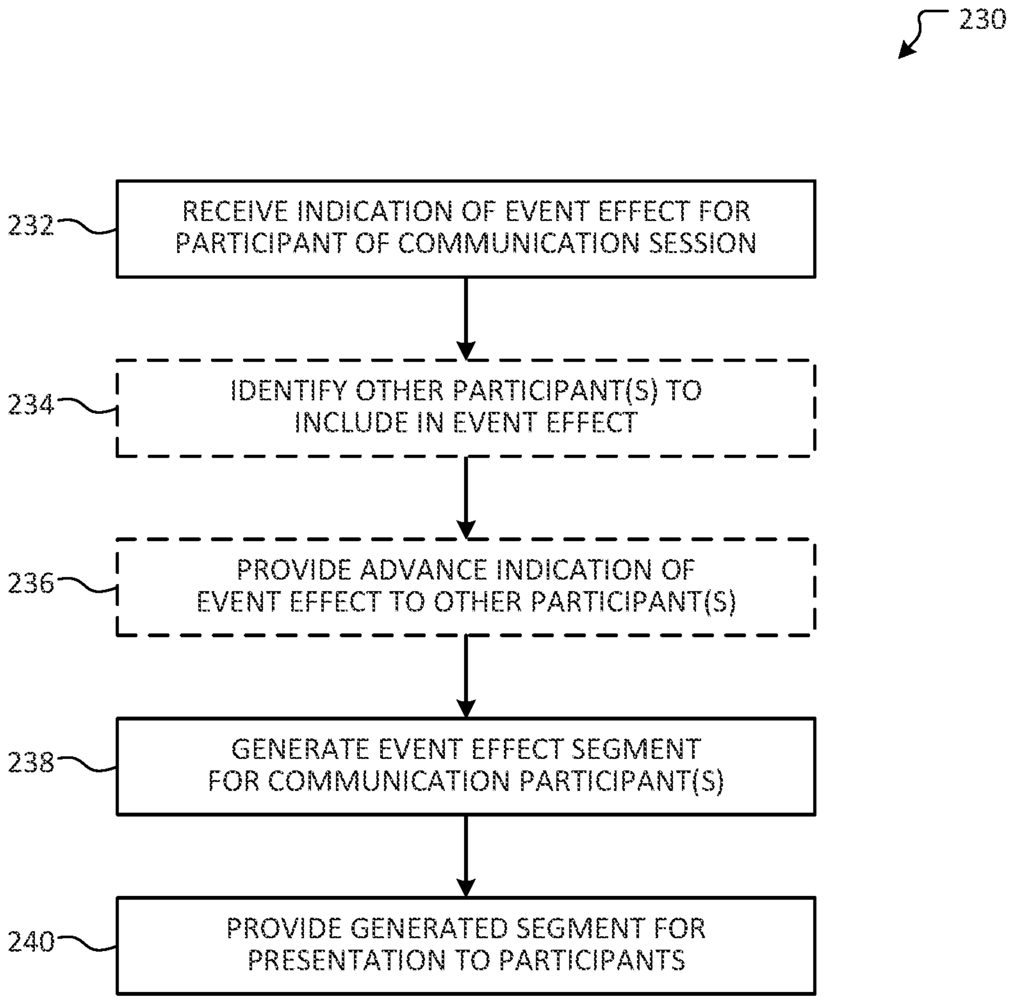
FIG. 2B illustrates an overview of an example method for processing a communication segue by one or more participants of a communication session according to aspects described herein.

FIG. 2B illustrates an overview of an example method 230 for processing a communication segue by one or more participants of a communication session according to aspects described herein. In examples, aspects of method 230 are performed by a communication platform, such as communication platform 102 discussed above with respect to FIG. 1.

As illustrated, method 230 begins at operation 232, where an indication of an event effect is received for a participant of a communication session. In examples, the indication is received as a result of a user actuating a "join with effect" button of a communication application, similar to the aspects discussed above with respect to operation 202 of method 200 in FIG. 2A.

At operation 234, it is determined whether there is another communication participant to include in the event effect. For example, operation 234 comprises identifying a communication participant that is joining contemporaneously (e.g., within a predetermined amount of time) with the communication participant for which the indication was received. As another example, operation 234 comprises identify another proximate participant, as may be the case when multiple participants are joining from the same location (e.g., the same conference room and/or via the same conferencing system). In a further example, a user indication is received (e.g., as a result of performing an additional instance of operation 232 for another participant), such that it is determined to include that user in the event effect accordingly. It will therefore be appreciated that one or more additional communication participants may be included in an event effect in any of a variety of scenarios. Operation 234 is illustrated using a dashed box to indicate that, in other examples, operation 234 is omitted.

Flow progresses to operation 236, where an advance indication of the event effect is provided to other participants of the communication session. As noted above, the advance indication may relate to entry of the communication participant(s) or, as another example, to an imminent departure of the communication participant(s), among other examples. The indication may be presented to communication participants using any of a variety of techniques, including, but not limited to, as part of a user interface of a communication application and/or as a superimposed countdown above a communication participant. Operation 236 is illustrated using a dashed box to indicate that, in other examples, operation 236 is omitted.

At operation 238, an event segment is generated for the one or more participants (e.g., for which the indication was received at operation 232 and, in some examples, that were identified at operation 234). Aspects of operation 238 are similar to those discussed above with respect to operations 204 and/or 206 and are therefore not necessarily redescribed in detail. For example, operation 238 comprises processing content of an event effect template to generate the event effect segment, for example by applying image/video editing techniques and/or by using one or more generative machine learning models according to aspects described herein. In examples, aspects of method 300 and/or method 350 discussed below with respect to FIGS. 3A and 3B, respectively, are performed as part of operation 238.

At operation 240, the generated event effect segment is distributed to communication participants of the communication session accordingly. In examples, the event segment is distributed as a set of content, including, but not limited to, one or more audio files, video files, text segments, and/or images, among other examples. In instances where the communication platform encodes a video feed for each participant (e.g., as may be the case for a group view or to improve bandwidth utilization), the event effect segment is incorporated into the encoded video stream accordingly. It will therefore be appreciated that any of a variety of techniques may be used to provide the generated event effect segment according to aspects described herein. As illustrated, method 230 terminates at operation 240.

Figure 2C:
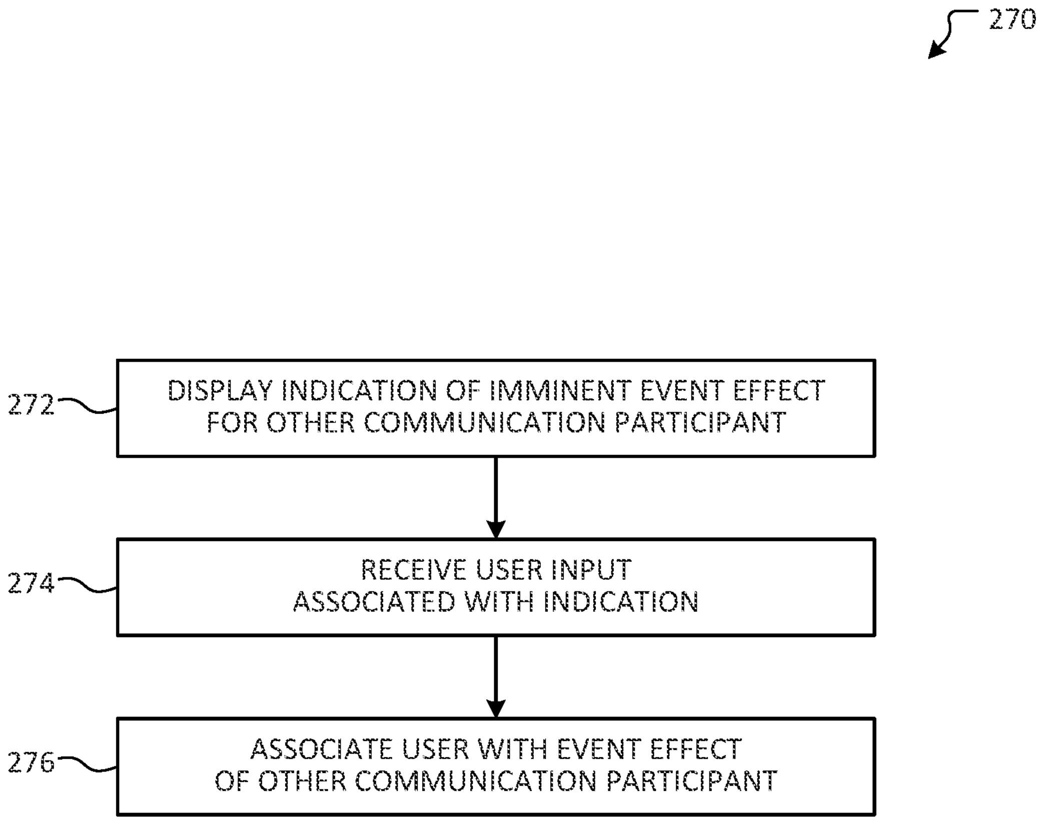
FIG. 2C illustrates an overview of an example method for processing a communication segue by one or more participants of a communication session according to aspects described herein.

FIG. 2C illustrates an overview of an example method 270 for processing a communication segue by one or more participants of a communication session according to aspects described herein. In examples, aspects of method 270 are performed by a communication application of a client computing device, such as communication application 118 and/or 124 of computing device 104 or 106, respectively.

As illustrated, method 270 begins at operation 272, where an indication of an imminent event effect for another communication participant is displayed. In examples, operation 272 occurs in response to operation 236 of method 230 discussed above with respect to FIG. 2B, where the advance indication is provided (e.g., by a communication platform) in response to an indication of an event effect that is to be performed for the other communication participant. As noted above, the advance indication may include a graphical user interface element indicating a countdown and/or a timer superimposed above a head of the participant, among other examples.

Flow progresses to operation 274, where user input associated with the advance indication is received. In examples, the user input comprises actuation of the advance indication and/or actuation of a user interface element displayed in conjunction with the advance indication, thereby indicating that the user wishes to join the participant's event effect (and the associated event, such as exiting the meeting). While examples are described with respect to a graphical advance indication and user input with a graphical element, it will be appreciated that a similar user experience may be additionally or alternatively provided via audio (e.g., an audio advance indication and spoken natural language input indicating a request to join the event effect), text, and/or a gesture, among other examples.

At operation 276, the user is associated with the event effect of the other communication participant. In examples, operation 276 comprises providing an indication to the communication platform to associate the user with the event effect (e.g., as may thus be received by the communication platform as a result of performing aspects of operations 232 and/or 234 discussed above with respect to method 250 of FIG. 2B).

As a result, an event effect segment is generated that thus includes the user and the other communication participant, for example according to the discussed above with respect to operations 206 and 208 or method 200 or operations 238 and 240 of method 250 in FIGS. 2A and 2B, respectively. In examples, at least a part of the event effect segment is generated by the user's client computing device and/or information with which to generate the event effect segment is provided by the user's client computing device to the communication platform, among other examples. As illustrated, method 270 terminates at operation 276.

Figure 3A:
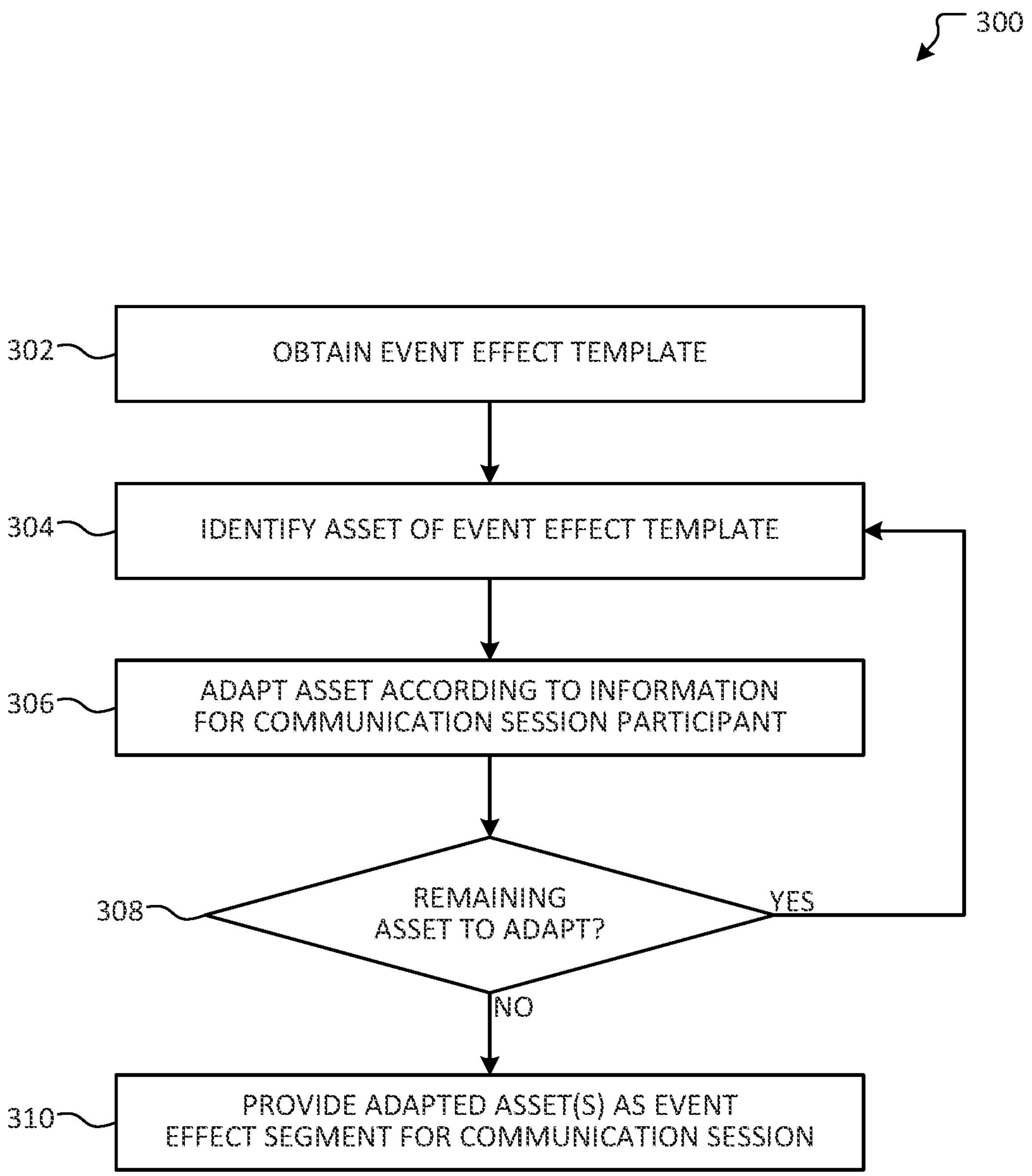
FIG. 3A illustrates an overview of an example method for processing an event effect template to generate an event effect segment for a communication participant according to aspects described herein.

FIG. 3A illustrates an overview of an example method 300 for processing an event effect template to generate an event effect segment for a communication participant according to aspects described herein. In examples, aspects of method 300 are performed by an event effect engine, such as event effect engine 112, 122, and/or 128 of communication platform 102, client computing device 104, and client computing device 106, respectively. In examples, aspects of method 300 are performed as part of generating an event segment, examples of which were discussed above with respect to operation 206 of method 200 in FIG. 2A and operation 238 of method 230 in FIG. 2B.

As illustrated, method 300 begins at operation 302, where an event effect template is obtained. In examples, the event effect template is obtained from an event effect template data store, such as event effect template data store 116 discussed above with respect to communication platform 102 in FIG. 1. In examples, the event effect template is obtained based on a user selection from a set of available event effects, a user preference indication, and/or as a result of a user indicating to join an event effect of another user, among other examples.

At operation 304, an asset of the event effect template is identified. Example assets include, but are not limited to, a video, an audio track, text, and/or an image, among other examples. Accordingly, at operation 306, the identified asset is adapted according to information for the communication session participant. In examples, at least a part of the information is obtained as part of operation 302. Additionally, or alternatively, other information is identified from any of a variety of data sources. In examples, the identified asset need not be adapted, such that operation 306 is omitted (e.g., for all assets or for a subset of assets). As noted above, adapting the identified asset may include incorporating text (e.g., a biography of the user, a meeting summary, takeaways, action items, etc.) and/or including a likeness of the communication participant in an image and/or video (e.g., using image editing and/or compositing techniques), among other examples.

At determination 308, it is determined whether there is a remaining asset to adapt. The determination may comprise evaluating whether any of the other assets of the event effect template have aspects to be populated with information relating to the communication participant and/or session. If it is determined that there is a remaining asset to adapt, flow branches "YES" and returns to operation 304, such that method 300 iterates through assets of the event effect template by performing operations 304, 306, and 308 until the assets of the event effect template are adapted.

If, however, it is determined there are no remaining assets to adapt, flow instead branches "NO" to operation 310, where the adapted assets are provided as an event effect segment for the communication session. For example, text, image, audio, and/or video content is provided for inclusion in the communication session, as may be provided to one or more communication applications and/or integrated into a text, audio, and/or video stream that is streamed to the communication participants, among other examples. As illustrated, method 300 terminates at operation 310.

Figure 3B:
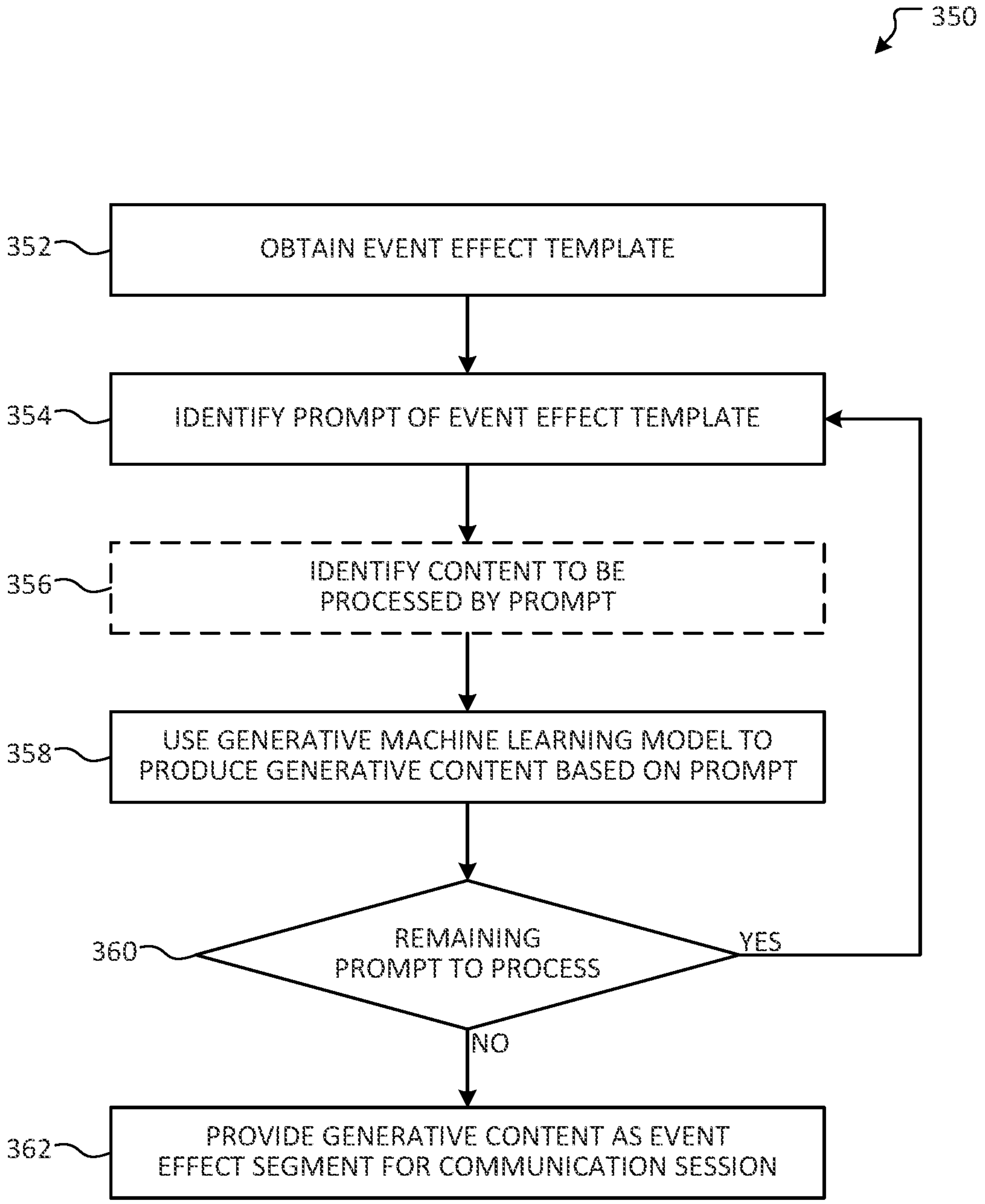
FIG. 3B illustrates an overview of another example method for processing an event effect template to produce generative content for an event effect segment according to aspects described herein.

FIG. 3B illustrates an overview of another example method 350 for processing an event effect template to produce generative content for an event effect segment according to aspects described herein. In examples, aspects of method 350 are performed by an event effect engine, such as event effect engine 112, 122, and/or 128 of communication platform 102, client computing device 104, and client computing device 106, respectively. In examples, aspects of method 350 are performed as part of generating an event segment, examples of which were discussed above with respect to operation 206 of method 200 in FIG. 2A and operation 238 of method 230 in FIG. 2B.

As illustrated, method 350 begins at operation 352, where an event effect template is obtained. In examples, the event effect template is obtained from an event effect template data store, such as event effect template data store 116 discussed above with respect to communication platform 102 in FIG. 1. In examples, the event effect template is obtained based on a user selection from a set of available event effects, a user preference indication, and/or as a result of a user indicating to join an event effect of another user, among other examples.

At operation 354, a prompt of the event effect template is identified. As noted above, one or more generative machine learning models may be used to produce generative content for an event effect segment according to aspects described herein. In examples, a prompt of an event effect template describes content to be generated by a generative model, content to be adapted by a generative model, and/or interactions between one or more models, among other examples. Additionally, or alternatively, the prompt includes an instruction to generate a set of steps for a user to follow, for example to capture image data of the user with which to produce the generative content.

Flow progresses to operation 356, where content to be processed by the prompt is identified. In examples, the prompt includes an indication as to which content is processed by the prompt. As another example, the prompt is processed by a generative machine learning model to generate instructions with which such content is accessed, captured, or otherwise obtained. In some examples, operation 356 comprises obtaining the content from a client computing device and/or providing instructions to the client computing device with which a user identifies, captures, or otherwise provides the content accordingly. Additionally, or alternatively, the identified content is part of the event effect template and/or was generated (e.g., by the same or a different machine learning model) as a result of a previous iteration of operations 354, 356, 358 and 360, among other examples. Operation 356 is illustrated using a dashed line to indicate that, in other examples, operation 356 may be omitted. For instance, operation 356 may be omitted when the prompt causes a generative model to generate content without any initial content.

At operation 358, a generative machine learning model is used to produce generated content based on the prompt accordingly. As noted above, any of a variety of machine learning models may be used to produce any of a variety of generative content according to aspects described herein. In some instances, operation 358 comprises using multiple generative machine learning models, for example where a first generative machine learning model produces a first instance of generative content, which is then processed by a second generative machine learning model accordingly.

At determination 360, it is determined whether there is a remaining prompt to process. In examples, the determination may identify a prompt of the event effect template and/or that was generated at operation 358 that has yet to be processed, such that flow branches "YES" and returns to operation 354, thereby iteratively processing one or more additional prompts via operations 354, 356, 358, and 360 to produce generative content for the event effect segment according to aspects described herein.

However, if it is determined that there is not a remaining prompt to generate, flow instead branches "NO" to operation 362, where the generative content is provided as an event effect segment for the communication session. In examples, an iteration of operation 358 processes multiple instances of content (e.g., as may have been produced by a generative model in a previous iteration and/or as was part of an event effect template), thereby generating aggregate content to provide as the event effect segment. Additionally, or alternatively, method 350 includes a step in which content is aggregated (e.g., to combine audio, video, text, and/or image data into content that can be provided via the communication session). Such content is thus provided for inclusion in the communication session, for example as may be provided to one or more communication applications and/or integrated into a text, audio, and/or video stream that is streamed to the communication participants, among other examples. As illustrated, method 350 terminates at operation 362.

Figure 4A:
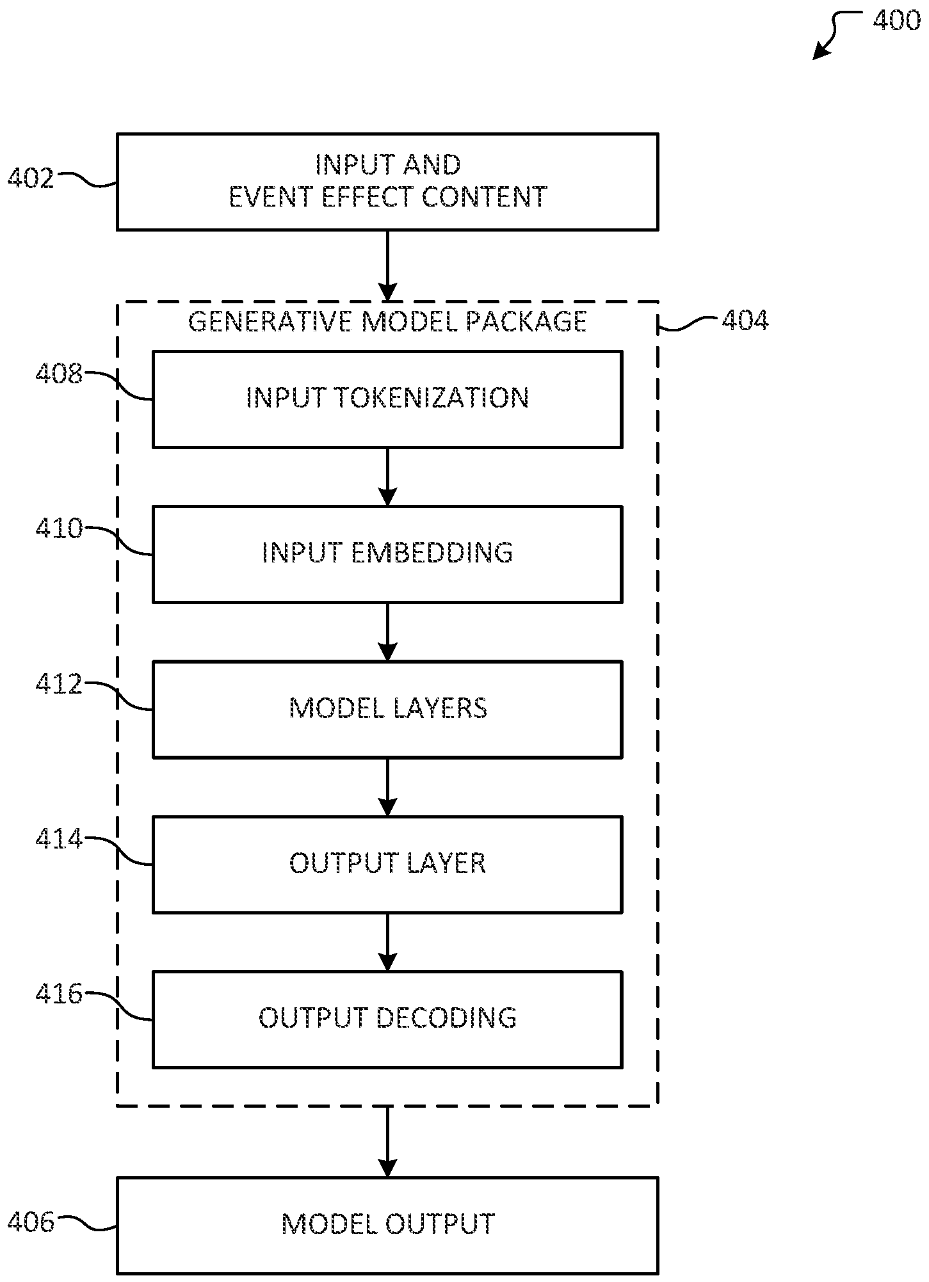
FIGS. 4A and 4B illustrate overviews of an example generative machine learning model that may be used according to aspects described herein.
Figure 4B:
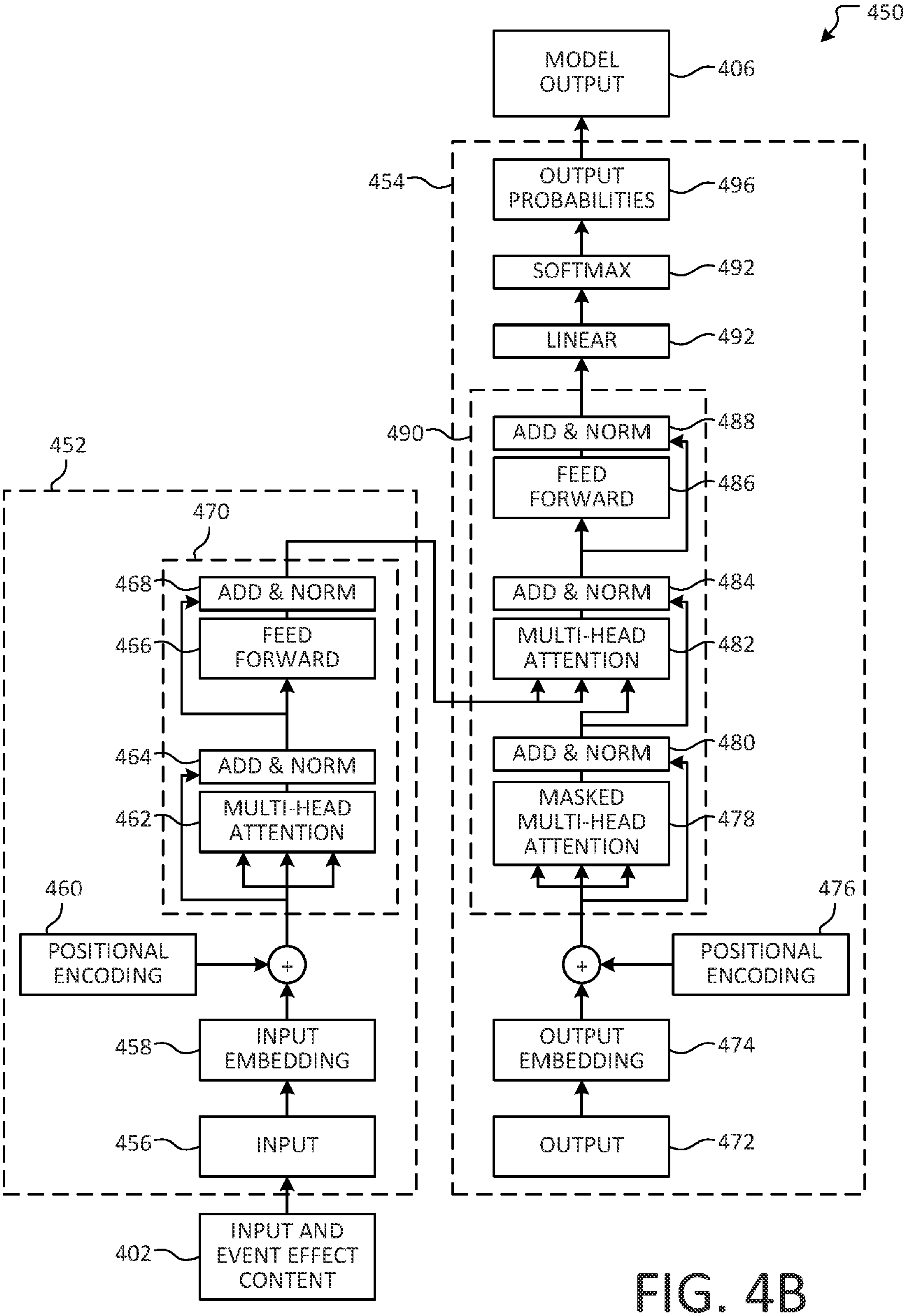

FIGS. 4A and 4B illustrate overviews of an example generative machine learning model that may be used according to aspects described herein. With reference first to FIG. 4A, conceptual diagram 400 depicts an overview of pre-trained generative model package 404 that processes an input and event effect content 402 to generate model output 406 that forms at least a part of an event effect segment according to aspects described herein.

In examples, generative model package 404 is pre-trained according to a variety of inputs (e.g., a variety of human languages, a variety of programming languages, and/or a variety of content types) and therefore need not be finetuned or trained for a specific scenario. Rather, generative model package 404 may be more generally pre-trained, such that input 402 includes a prompt that is generated, selected, or otherwise engineered to induce generative model package 404 to produce certain generative model output 406. It will be appreciated that input 402 and generative model output 406 may each include any of a variety of content types, including, but not limited to, text output, image output, audio output, video output, programmatic output, and/or binary output, among other examples. In examples, input 402 and generative model output 406 may have different content types, as may be the case when generative model package 404 includes a generative multimodal machine learning model.

As such, generative model package 404 may be used in any of a variety of scenarios and, further, a different generative model package may be used in place of generative model package 404 without substantially modifying other associated aspects (e.g., similar to those described herein with respect to FIGS. 1, 2A, 2B, 2C, 3A, and 3B). Accordingly, generative model package 404 operates as a tool with which machine learning processing is performed, in which certain inputs 402 to generative model package 404 are programmatically generated or otherwise determined, thereby causing generative model package 404 to produce model output 406 that may subsequently be used for further processing.

Generative model package 404 may be provided or otherwise used according to any of a variety of paradigms. For example, generative model package 404 may be used local to a computing device (e.g., communication platform 102 in FIG. 1) or may be accessed remotely (e.g., client computing device 104 and/or 106). In other examples, aspects of generative model package 404 are distributed across multiple computing devices. In some instances, generative model package 404 is accessible via an API, as may be provided by an operating system of the computing device and/or by the machine learning service, among other examples.

With reference now to the illustrated aspects of generative model package 404, generative model package 404 includes input tokenization 408, input embedding 410, model layers 412, output layer 414, and output decoding 416. In examples, input tokenization 408 processes input 402 to generate input embedding 410, which includes a sequence of symbol representations that corresponds to input 402. Accordingly, input embedding 410 is processed by model layers 412, output layer 414, and output decoding 416 to produce model output 406. An example architecture corresponding to generative model package 404 is depicted in FIG. 4B, which is discussed below in further detail. Even so, it will be appreciated that the architectures that are illustrated and described herein are not to be taken in a limiting sense and, in other examples, any of a variety of other architectures may be used.

FIG. 4B is a conceptual diagram that depicts an example architecture 450 of a pre-trained generative machine learning model that may be used according to aspects described herein. As noted above, any of a variety of alternative architectures and corresponding ML models may be used in other examples without departing from the aspects described herein.

As illustrated, architecture 450 processes input 402 to produce generative model output 406, aspects of which were discussed above with respect to FIG. 4A. Architecture 450 is depicted as a transformer model that includes encoder 452 and decoder 454. Encoder 452 processes input embedding 458 (aspects of which may be similar to input embedding 410 in FIG. 4A), which includes a sequence of symbol representations that corresponds to input 456. In examples, input 456 includes input and event effect content 402, for example to incorporate a likeness of a communication participant into generative output and/or existing content of an event effect template, among other examples. Such aspects may be similar to those discussed above with respect to event effect engine 112 and/or generative machine learning engine 114 in FIG. 1, for example by performing aspects of methods 200, 230, and/or 350 in FIGS. 2A, 2B, and 3B, respectively.

Further, positional encoding 460 may introduce information about the relative and/or absolute position for tokens of input embedding 458. Similarly, output embedding 474 includes a sequence of symbol representations that correspond to output 472, while positional encoding 476 may similarly introduce information about the relative and/or absolute position for tokens of output embedding 474.

As illustrated, encoder 452 includes example layer 470. It will be appreciated that any number of such layers may be used, and that the depicted architecture is simplified for illustrative purposes. Example layer 470 includes two sub-layers: multi-head attention layer 462 and feed forward layer 466. In examples, a residual connection is included around each layer 462, 466, after which normalization layers 464 and 468, respectively, are included. Decoder 454 includes example layer 490. Similar to encoder 452, any number of such layers may be used in other examples, and the depicted architecture of decoder 454 is simplified for illustrative purposes. As illustrated, example layer 490 includes three sub-layers: masked multi-head attention layer 478, multi-head attention layer 482, and feed forward layer 486. Aspects of multi-head attention layer 482 and feed forward layer 486 may be similar to those discussed above with respect to multi-head attention layer 462 and feed forward layer 466, respectively. Additionally, masked multi-head attention layer 478 performs multi-head attention over the output of encoder 452 (e.g., output 472). In examples, masked multi-head attention layer 478 prevents positions from attending to subsequent positions. Such masking, combined with offsetting the embeddings (e.g., by one position, as illustrated by multi-head attention layer 482), may ensure that a prediction for a given position depends on known output for one or more positions that are less than the given position. As illustrated, residual connections are also included around layers 478, 482, and 486, after which normalization layers 480, 484, and 488, respectively, are included.

Multi-head attention layers 462, 478, and 482 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 4B (e.g., by a corresponding normalization layer 464, 480, or 484).

Feed forward layers 466 and 486 may each be a fully connected feed-forward network, which applies to each position. In examples, feed forward layers 466 and 486 each include a plurality of linear transformations with a rectified linear unit activation in between. In examples, each linear transformation is the same across different positions, while different parameters may be used as compared to other linear transformations of the feed-forward network.

Additionally, aspects of linear transformation 492 may be similar to the linear transformations discussed above with respect to multi-head attention layers 462, 478, and 482, as well as feed forward layers 466 and 486. Softmax 494 may further convert the output of linear transformation 492 to predicted next-token probabilities, as indicated by output probabilities 496. It will be appreciated that the illustrated architecture is provided in as an example and, in other examples, any of a variety of other model architectures may be used in accordance with the disclosed aspects.

Accordingly, output probabilities 496 may thus form model output 406 according to aspects described herein, such that the output of the generative ML model (e.g., which may thus comprise generative content for an event effect segment) is used, for example, as an introduction segment or as an outro segment of one or more communication participants according to aspects described herein.

Figure 5:
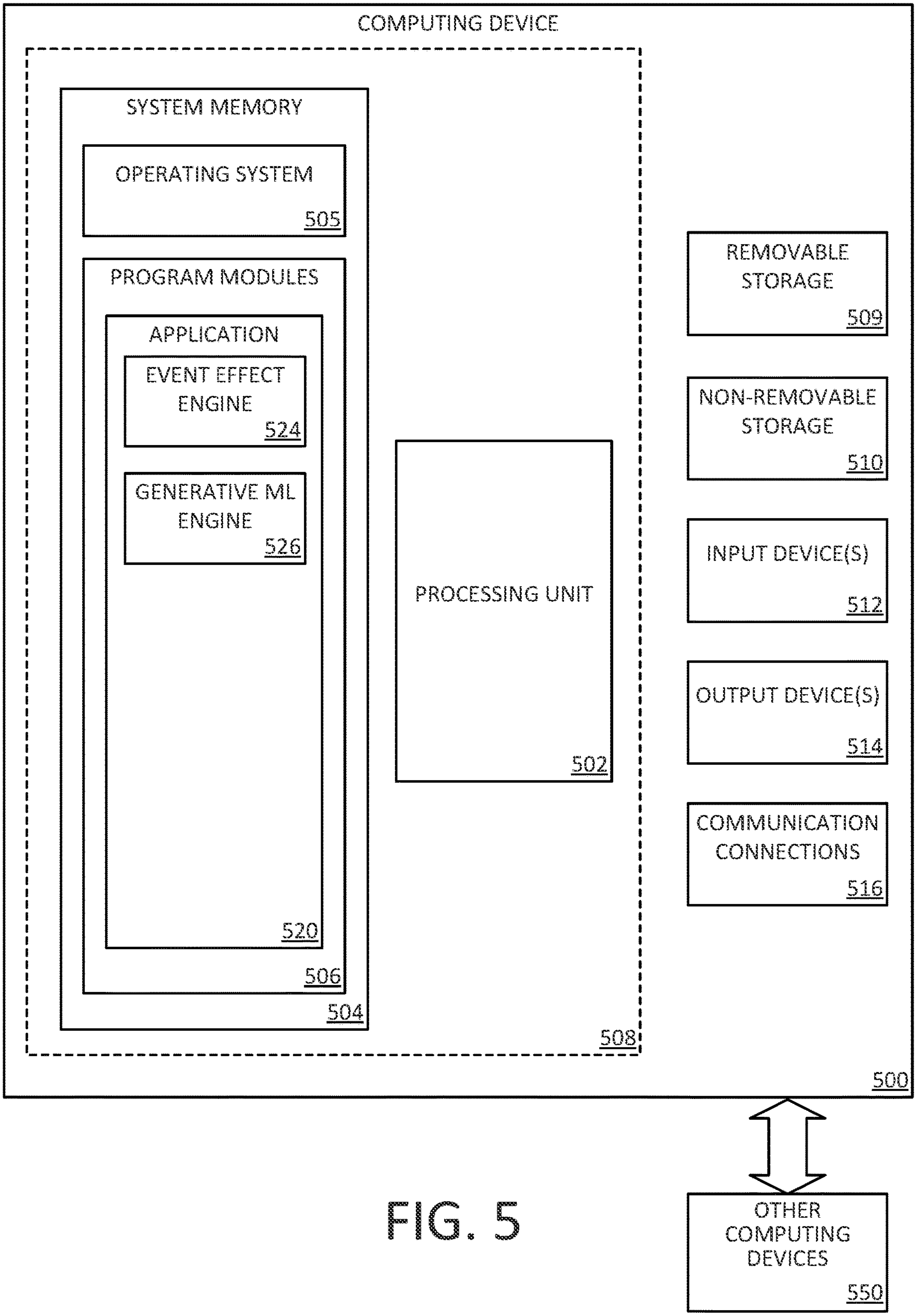
FIG. 5 is a block diagram illustrating example physical components of a computing device with which aspects of the disclosure may be practiced.
Figure 6:
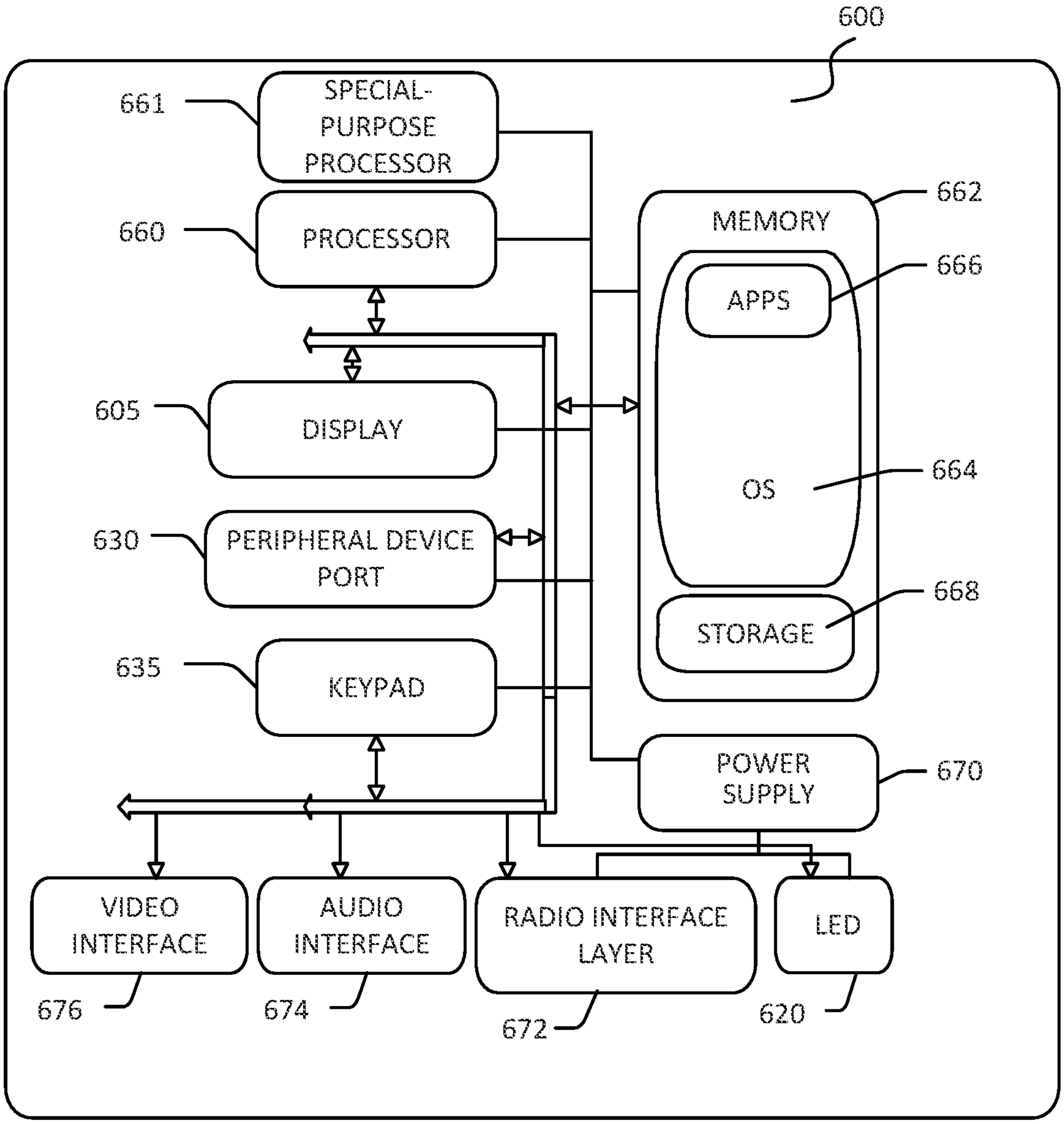
FIG. 6 is a simplified block diagram of a computing device with which aspects of the present disclosure may be practiced.
Figure 7:
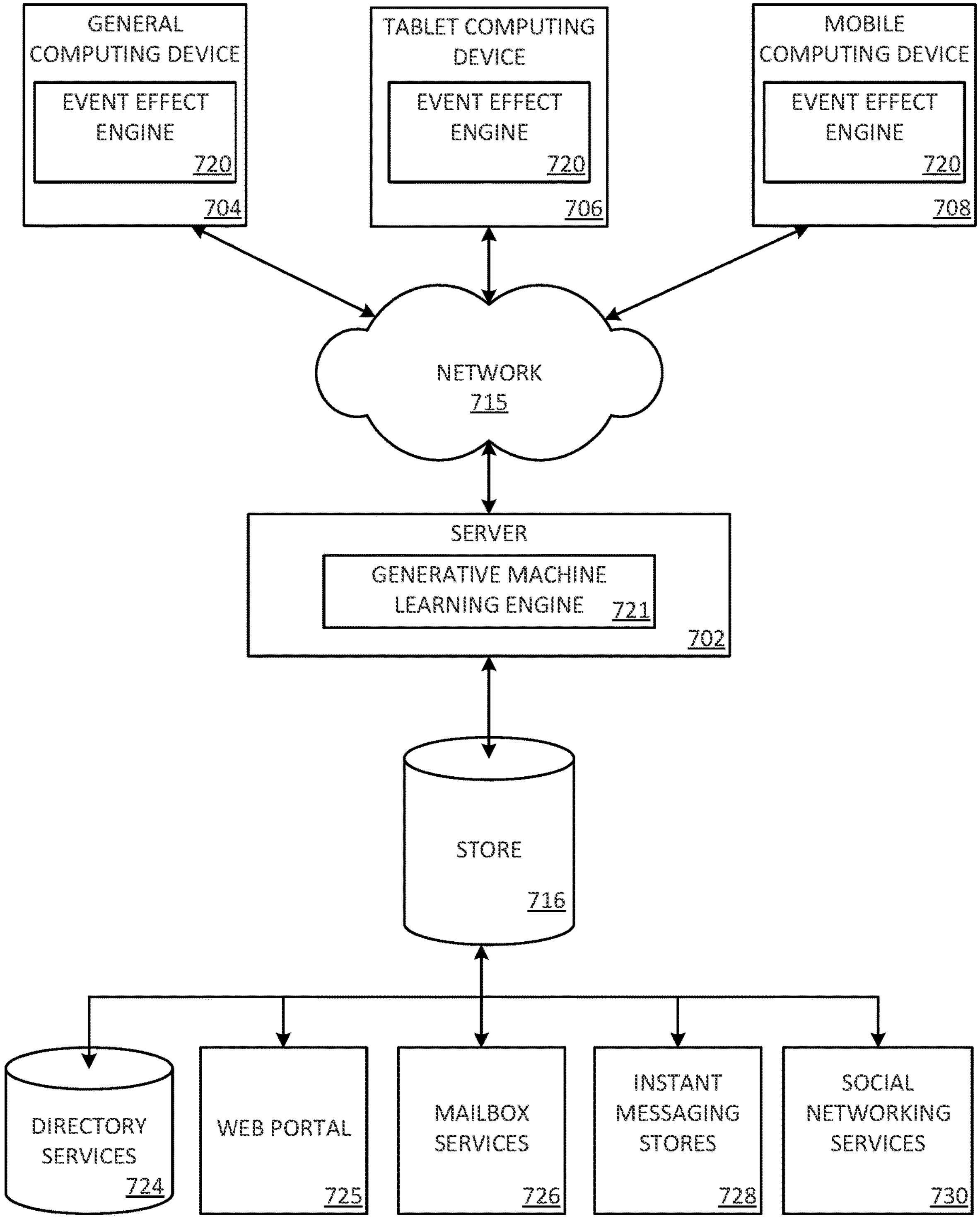
FIG. 7 is a simplified block diagram of a distributed computing system in which aspects of the present disclosure may be practiced.

FIGS. 5-7 and the associated descriptions provide a discussion of a variety of operating environments in which aspects of the disclosure may be practiced. However, the devices and systems illustrated and discussed with respect to FIGS. 5-7 are for purposes of example and illustration and are not limiting of a vast number of computing device configurations that may be utilized for practicing aspects of the disclosure, described herein.

FIG. 5 is a block diagram illustrating physical components (e.g., hardware) of a computing device 500 with which aspects of the disclosure may be practiced. The computing device components described below may be suitable for the computing devices described above, including one or more devices associated with communication platform 102, as well as client computing devices 104 and/or 106 discussed above with respect to FIG. 1. In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combination of such memories.

The system memory 504 may include an operating system 505 and one or more program modules 506 suitable for running software application 520, such as one or more components supported by the systems described herein. As examples, system memory 504 may include event effect engine 524 and generative machine learning engine 526. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., application 520) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIG. 6 illustrates a system 600 that may, for example, be a mobile computing device, such as a mobile telephone, a smart phone, wearable computer (such as a smart watch), a tablet computer, a laptop computer, and the like, with which embodiments of the disclosure may be practiced. In one embodiment, the system 600 is implemented as a "smart phone" capable of running one or more applications (e.g., browser, e-mail, calendaring, contact managers, messaging clients, games, and media clients/players). In some aspects, the system 600 is integrated as a computing device, such as an integrated personal digital assistant (PDA) and wireless phone.

In a basic configuration, such a mobile computing device is a handheld computer having both input elements and output elements. The system 600 typically includes a display 605 and one or more input buttons that allow the user to enter information into the system 600. The display 605 may also function as an input device (e.g., a touch screen display).

If included, an optional side input element allows further user input. For example, the side input element may be a rotary switch, a button, or any other type of manual input element. In alternative aspects, system 600 may incorporate more or less input elements. For example, the display 605 may not be a touch screen in some embodiments. In another example, an optional keypad 635 may also be included, which may be a physical keypad or a "soft" keypad generated on the touch screen display.

In various embodiments, the output elements include the display 605 for showing a graphical user interface (GUI), a visual indicator (e.g., a light emitting diode 620), and/or an audio transducer 625 (e.g., a speaker). In some aspects, a vibration transducer is included for providing the user with tactile feedback. In yet another aspect, input and/or output ports are included, such as an audio input (e.g., a microphone jack), an audio output (e.g., a headphone jack), and a video output (e.g., a HDMI port) for sending signals to or receiving signals from an external device.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 600 also includes a non-volatile storage area 668 within the memory 662. The non-volatile storage area 668 may be used to store persistent information that should not be lost if the system 600 is powered down. The application programs 666 may use and store information in the non-volatile storage area 668, such as e-mail or other messages used by an e-mail application, and the like. A synchronization application (not shown) also resides on the system 600 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the system 600 described herein.

The system 600 has a power supply 670, which may be implemented as one or more batteries. The power supply 670 might further include an external power source, such as an AC adapter or a powered docking cradle that supplements or recharges the batteries.

The system 600 may also include a radio interface layer 672 that performs the function of transmitting and receiving radio frequency communications. The radio interface layer 672 facilitates wireless connectivity between the system 600 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated embodiment, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 600 may further include a video interface 676 that enables an operation of an on-board camera 630 to record still images, video stream, and the like.

It will be appreciated that system 600 may have additional features or functionality. For example, system 600 may also include additional data storage devices (removable and/or non-removable) such as, magnetic disks, optical disks, or tape. Such additional storage is illustrated in FIG. 6 by the non-volatile storage area 668.

Data/information generated or captured and stored via the system 600 may be stored locally, as described above, or the data may be stored on any number of storage media that may be accessed by the device via the radio interface layer 672 or via a wired connection between the system 600 and a separate computing device associated with the system 600, for example, a server computer in a distributed computing network, such as the Internet. As should be appreciated, such data/information may be accessed via the radio interface layer 672 or via a distributed computing network. Similarly, such data/information may be readily transferred between computing devices for storage and use according to any of a variety of data/information transfer and storage means, including electronic mail and collaborative data/information sharing systems.

FIG. 7 illustrates one aspect of the architecture of a system for processing data received at a computing system from a remote source, such as a personal computer 704, tablet computing device 706, or mobile computing device 708, as described above. Content displayed at server device 702 may be stored in different communication channels or other storage types. For example, various documents may be stored using a directory service 724, a web portal 725, a mailbox service 726, an instant messaging store 728, or a social networking site 730.

An event effect engine 720 may be employed by a client that communicates with server device 702. Additionally, or alternatively, generative machine learning engine 721 may be employed by server device 702. The server device 702 may provide data to and from a client computing device such as a personal computer 704, a tablet computing device 706 and/or a mobile computing device 708 (e.g., a smart phone) through a network 715. By way of example, the computer system described above may be embodied in a personal computer 704, a tablet computing device 706 and/or a mobile computing device 708 (e.g., a smart phone). Any of these examples of the computing devices may obtain content from the store 716, in addition to receiving graphical data useable to be either pre-processed at a graphic-originating system, or post-processed at a receiving computing system.

It will be appreciated that the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As will be understood from the foregoing disclosure, one aspect of the technology relates to a system comprising: at least one processor; and memory storing instructions that, when executed by the at least one processor, cause the system to perform a set of operations. The set of operations comprises: receiving, from a first computing device of a first participant of a communication session, a user indication of an event effect for the communication session; generating, for the participant, an event effect segment based on an event effect template corresponding to the indicated event effect; and providing, to a second computing device of a second participant of the communication session, the event effect segment for presentation to the second participant. In an example, the event effect template includes a prompt and generating the event effect segment comprises: processing, using a generative machine learning model, the prompt to produce generative content that is included in the generated event effect segment. In another example, the event effect template further comprises content and processing the prompt further comprises using the generative machine learning model to process the content of the event effect template. In a further example, the set of operations further comprises obtaining additional information associated with the first participant of the communication session, wherein the additional information is at least one of: obtained from the first communication participant via the first computing device; generated based on a transcript of the communication session; or identified from a remote data source based on an association with at least one of the first participant or the communication session; and the event segment is further generated based on the additional information. In yet another example, the event effect template comprises content that is edited to include a likeness of the user as at least a part of generating the event effect segment. In a further still example, the set of operations further comprises receiving, from a third computing device of a third participant of the communication session, an indication to join the event effect of the first participant; and the event effect segment is further generated for the third participant of the communication session. In another example, the event effect is one of: an introduction for the first participant; or an outro for the first participant. In a further example, providing the event effect segment further comprises providing an advance indication for presentation prior to presentation of the event effect segment for the first participant. In yet another example, the event effect is associated with a virtual background of the first participant of the communication session.

In another aspect, the technology relates to a method for managing an event of a communication session. The method comprises: receiving, from a user, an indication to initiate an event effect for the communication session; generating an event effect segment based on an event effect template for the event effect; and causing the event effect segment to be displayed to one or more other participants of the communication session. In an example, receiving the indication to initiate the event effect comprises receiving a user selection of a first user interface element from a set of user interface elements that comprises: the first user interface element; and a second user interface element that causes the user to join the communication session without an event effect. In another example, receiving the indication to initiate the event effect comprises receiving a user selection of a first user interface element from a set of user interface elements that comprises: the first user interface element; and a second user interface element that causes the user to leave the communication session without an event effect. In a further example, generating the event effect segment comprises: obtaining one or more images of the user; and processing the one or more images of the user to generate the event effect segment that includes a likeness of the user. In yet another example, the one or more images of the user are at least one of: captured from a video feed of the communication session; or captured using an image capture device to capture the user assuming one or more poses associated with the event effect template.

In a further aspect, the technology relates to another method for managing a communication session. The method comprises: receiving, from a first computing device of a first participant of a communication session, a user indication of an event effect for the communication session; processing, using a generative machine learning model, a prompt of an event effect template corresponding to the indicated event effect to generate an event effect segment for the participant; and providing, to a second computing device of a second participant of the communication session, the event effect segment for presentation to the second participant. In an example, the event effect template further comprises content and processing the prompt further comprises using the generative machine learning model to process the content of the event effect template. In another example, the generative machine learning model further processes image data of the participant to generate the event effect segment that includes a likeness of the user. In a further example, the image data of the participant is obtained from the communication session. In yet another example, the generative machine learning model is a first generative machine learning model and processing the prompt to generate the event effect segment further comprises processing by a second generative machine learning model. In a further still example, the second generative machine learning model produces a different type of content than the first generative machine learning model.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application.

Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:

at least one processor; and memory storing instructions that, when executed by the at least one processor, cause the system to perform a set of operations, the set of operations comprising:

receiving, from a first computing device of a first participant of a communication session, a user indication of an event effect for the communication session;

obtaining a prompt for a generative machine learning model, the prompt requesting generation of at least one of image, video, or audio;

inputting the prompt to the generative machine learning model;

receiving, from the generative machine learning model, at least one of generated image data, generated video data, or generated audio data;

generating, for the first participant, an event effect segment that includes the at least one of generated image data, generated video data, or generated audio data; and providing, to a second computing device of a second participant of the communication session, the event effect segment for presentation to the second participant.

2. The system of claim 1, wherein the prompt is obtained from an event effect template.

3. The system of claim 2, wherein the set of operations further comprises:

providing content from the event effect template to the generative machine learning model, wherein the generative machine learning model employs the content from the event effect template to produce the generated image data, generated video data, or generated audio data.

4. The system of claim 1, wherein:

the set of operations further comprises obtaining additional information associated with the first participant of the communication session, wherein the additional information is at least one of:

obtained from the first participant via the first computing device;

generated based on a transcript of the communication session; or identified from a remote data source based on an association with at least one of the first participant or the communication session; and the event effect segment is further generated based on the additional information.

5. The system of claim 1, wherein the set of operations further comprises:

accessing an event effect template that comprises content; and editing the content to include a likeness of the first participant as at least a part of generating the event effect segment.

6. The system of claim 1, wherein the set of operations further comprises:

receiving, from a third computing device of a third participant of the communication session, an indication to join the event effect of the first participant; and generating the event effect segment for the third participant of the communication session.

7. The system of claim 1, wherein the event effect is one of:

an introduction for the first participant; or an outro for the first participant.

8. The system of claim 1, wherein providing the event effect segment further comprises providing an advance indication for presentation prior to presentation of the event effect segment for the first participant.

9. The system of claim 1, wherein the event effect is associated with a virtual background of the first participant of the communication session.

10. A method for managing an event of a communication session, the method comprising:

receiving, from a user, an indication to initiate an event effect for the communication session;

generating an event effect segment based on an event effect template for the event effect, wherein generating the event effect segment comprises:

obtaining one or more images of the user; and processing the one or more images of the user to generate the event effect segment that includes a likeness of the user; and causing the event effect segment to be displayed to one or more other participants of the communication session.

11. The method of claim 10, wherein receiving the indication to initiate the event effect comprises receiving a user selection of a first user interface element from a set of user interface elements that comprises:

the first user interface element; and a second user interface element that causes the user to join the communication session without an event effect.

12. The method of claim 10, wherein receiving the indication to initiate the event effect comprises receiving a user selection of a first user interface element from a set of user interface elements that comprises:

the first user interface element; and a second user interface element that causes the user to leave the communication session without an event effect.

13. The method of claim 10, wherein the one or more images of the user are at least one of:

captured from a video feed of the communication session; or captured using an image capture device to capture the user assuming one or more poses associated with the event effect template.

14. A method of managing a communication session, the method comprising:

receiving, from a first computing device of a first participant of a communication session, a user indication of an event effect for the communication session;

processing, using a generative machine learning model, a prompt of an event effect template corresponding to the indicated event effect to generate an event effect segment for the first participant, wherein the generative machine learning model further processes image data of the first participant to generate the event effect segment that includes a likeness of the first participant; and providing, to a second computing device of a second participant of the communication session, the event effect segment for presentation to the second participant.

15. The method of claim 14, wherein the event effect template further comprises content and processing the prompt further comprises using the generative machine learning model to process the content of the event effect template.

16. The method of claim 15, wherein the image data of the first participant is obtained from the communication session.

17. The method of claim 14, wherein the generative machine learning model is a first generative machine learning model and processing the prompt to generate the event effect segment further comprises processing by a second generative machine learning model.

18. The method of claim 17, wherein the second generative machine learning model produces a different type of content than the first generative machine learning model.

* * * * *